June 4, 1963

J. B. BROWN ET AL 3,092,262

ARTICLE TRANSFER SYSTEM

Filed Jan. 12, 1959

INVENTORS
JOE B. BROWN
ROBERT E. PLACE
BY
*Whittemore*
*Hulbert & Belknap*
ATTORNEYS

FIG. 4.

INVENTORS
JOE B. BROWN
ROBERT E. PLACE
BY
ATTORNEYS

FIG.5.

United States Patent Office 3,092,262
Patented June 4, 1963

3,092,262
ARTICLE TRANSFER SYSTEM
Joe B. Brown, East Lansing, and Robert E. Place, Lansing, Mich., assignors to Planet Corporation, Lansing, Mich., a corporation of Michigan
Filed Jan. 12, 1959, Ser. No. 786,246
4 Claims. (Cl. 214—1)

This invention relates to article transfer systems and refers more particularly to a system whereby an article setting on an object moving on a conveyor may be removed from said conveyor at a first point thereon in response to the arrival of the object at the first point, transferred laterally with respect to the conveyor and placed on an object traveling on the conveyor at a second point at which the conveyor is moving parallel to and in the opposite direction from its movement at the first point in response to the arrival at the second point of an article on the moving conveyor.

The transportation of articles such as weights on a conveyor between points thereon to aid in the production of the product traveling on said conveyor necessitates the grasping of the moving articles at the point on the conveyor where they are no longer needed, the removal of the articles from the conveyor at that point, the return of the articles to a point where they may be reused and the replacing of the articles on the moving conveyor at the last mentioned point. In the past these operations or parts thereof have been performed manually or at best by separate disconnected machine aids. Such manual or disconnected machine operations are wasteful of human abilities and inappreciative of machine capabilities.

Therefore one of the essential objects of this invention is to provide automatic means to remove articles from a moving conveyor line at one point, transport them to a second point on the conveyor and redeposit them on the moving conveyor at the second point.

Another object is to provide means to remove articles traveling on a continuous conveyor at one point, transport them laterally to a second point on the conveyor and redeposit them on the moving conveyor which means may be totally automatic or may be manually operated.

Another object is to provide means to engage a weight setting on an object moving at a first point on a conveyor, lift the weight from the object, transfer the weight laterally, lower the weight into registration with a second object on said moving conveyor at a second point and disengage said weight.

Another object is to provide means by which a weight traveling on an object on a continuous conveyor may be removed from the continuous conveyor in response to the arrival of the object at a predetermined point, transferred laterally to the continuous conveyor and replaced on the object traveling on the continuous conveyor at a second point in response to the object's arrival at the second point.

Another object is to provide free running conveyor means whereby articles may be transferred laterally from a first point on a continuous conveyor to a second point thereon and stored at said second point until needed.

Another object is to provide a process by which an article may be transferred from one point on a moving conveyor to a second point on the conveyor at which the conveyor is moving parallel to and in the opposite direction from its movement at said first point.

Another object is to provide a process by which a weight traveling on an object on a continuous conveyor may be removed from the continuous conveyor in response to the arrival of the object at a predetermined point, transferred laterally to the continuous conveyor and replaced on the object traveling on the continuous conveyor at a second point in response to the article's arrival at the second point.

Another object is to provide a separate conveyor transverse between two points on a continuous conveyor, the separate conveyor having at each end thereof a support frame with a track mounted thereon and a transfer carriage horizontally movable on said track, the transfer carriage having a vertically movable lift including rotating hooks attached thereto whereby articles may be transferred between said two points on the continuous conveyor.

Another object is to provide a separate conveyor transverse between two points on a moving conveyor, the separate conveyor having at each end thereof a support frame with a lift thereon capable of horizontal and vertical movement and means to actuate the lift to engage, lift, transfer, lower and disengage a weight whereby weights may be automatically transferred between said two points.

Another object is to provide a means to transfer weights transversely between points on a conveyor which is simple in construction, easy to manufacture and efficient in use.

Other objects and features of the invention will become apparent as the description proceeds, especially when taken in conjunction with the accompanying drawings, illustrating a preferred embodiment of the invention, wherein:

A specific embodiment of the transfer system according to the invention is shown in the figures. The transfer system generally designated 10 includes a separate conveyor 12 having at either end thereof a transfer device 14 and 15 respectively for engaging, lifting, moving horizontally, lowering and disengaging weights 16 whereby the weights traveling on continuous conveyor 18 from point 20 to point 22 may be transferred back to point 20 on arrival at point 22.

Figure 1:
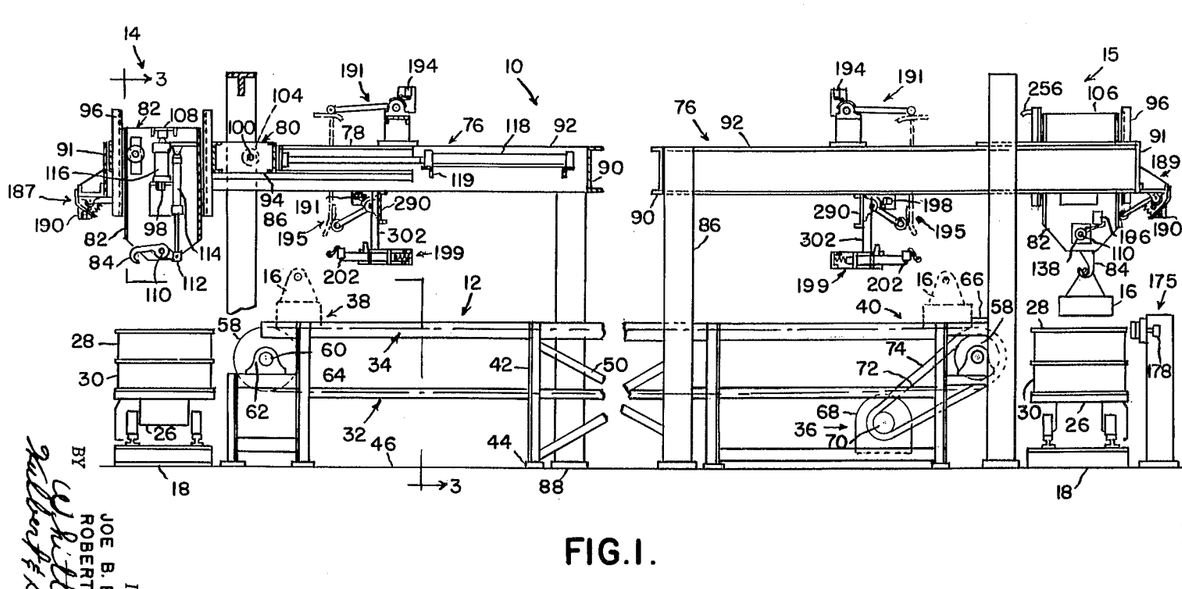
FIGURE 1 is a side view of a transfer system according to the invention, the left hand end of which is partly in section along line 1—1 in FIGURE 2.
Figure 2:
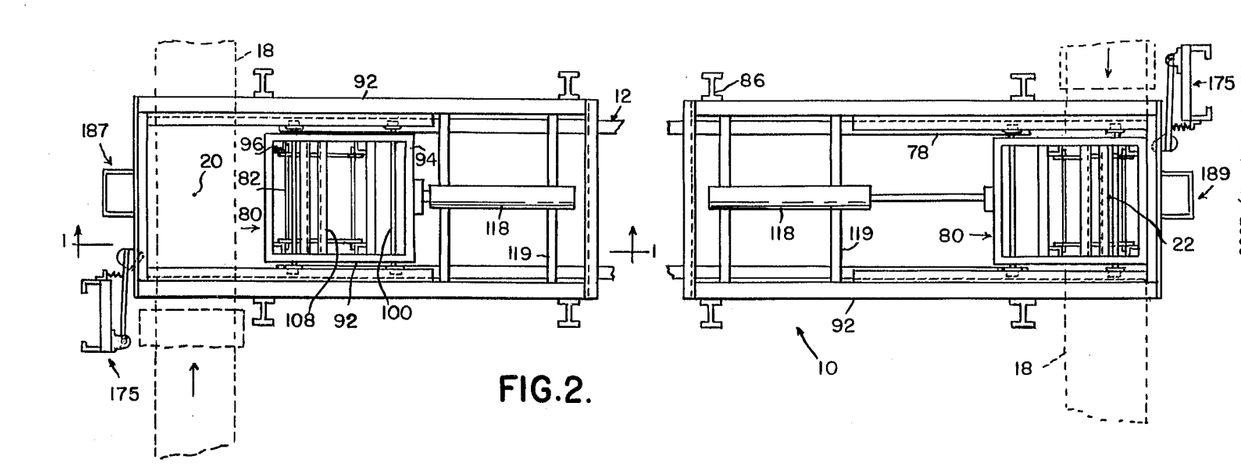
FIGURE 2 is a plan view of the transfer system of FIGURE 1.

Continuous conveyor 18 illustrated in FIGURES 1 and 2 includes a horizontal track which is traveling in opposite directions at points 20 and 22 as indicated by the arrows in FIGURE 2. Flat cars 26 are moved along conveyor 18 by uniform drive means such as a drag line (not shown). Molds including cope 28 and drag 30 are positioned on cars 26. Weights 16 are placed on top of moving cope 28 at point 20 to provide ballast therefor. Weights 16 are removed from moving cope 28 at point 22 by transfer device 15 and deposited on separate conveyor 12. Weights 16 are then transported laterally on conveyor 12 to transfer device 14 which removes the weights 16 from conveyor 12 and places them on another cope 28 traveling on conveyor 18 at point 20 whereby weights 16 repeat their travel to point 22 on continuous conveyor 18.

Conveyor 12 is positioned between points 20 and 22 on conveyor 18 and includes a structural frame 32, an endless belt 34 and drive means 36 for belt 34. Conveyor 12 functions to transport weights 16 deposited thereon at end 38 to end 40 where the weights are stored until needed at point 20 on conveyor 18.

The structural frame 32 includes vertical posts 42 positioned on bearing plates 44 which may be secured to a floor 46 by means such as anchor bolts (not shown), horizontal beams 48 between posts 42 crosswise of conveyor 12, diagonal bracing 50 between posts 42 lengthwise of conveyor 12 and knee bracing 52 between beams 48 and posts 42. The frame 32 may be of structural steel and may be welded or riveted together.

Figure 3:
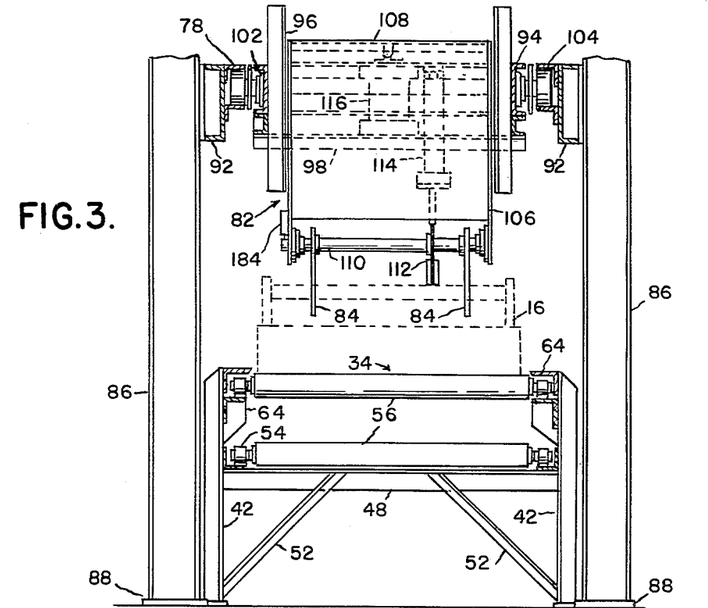
FIGURE 3 is a cross-sectional view of the transfer system in FIGURE 1 taken on offset line 3—3 in FIGURE 1.

Endless belt 34 includes chains 54 on both ends of rollers 56. Rollers 56 are placed side by side with the ends thereof rotatably mounted in chains 54. A sprocket 58, axle 60 and mounting means 62 attached to frame 32 are provided for endless belt 34 at both ends of conveyor 12 as shown in FIGURE 1. Intermediate angle brackets and guides 64 are provided along the length of conveyor 12 to add rigidity to frame 32 and to support belt 34 as indicated in FIGURES 1 and 3. Stop means 66 is provided at end 40 of belt 34 to prevent weights 16 from falling off the end of the belt.

Weights 16 are stored at end 40 of belt 34 until it is desired to transfer them to a cope 28 at point 20. Due to the rotatable mounting of the ends of rollers 56 in chains 54 belt 34 may be continuously driven with weights 16 resting thereon and butted against stop 66 at end 40 of conveyor 12. This action assures that a weight 16 will be in position at end 40 to be picked up by transfer device 15 at all times and that space will be available at end 38 for the deposit of weights 16 on conveyor 12 by transfer device 14.

Drive means 36 includes motor 68, sprocket 70, drive chain 72 and chain guard 74 positioned as indicated in FIGURE 1. Drive chain 72 is connected to sprocket 58 at end 40 of conveyor 12 as shown. Endless belt 34 is driven so that the top thereof advances toward end 40 of conveyor 12.

Transfer devices 14 and 15 at ends 38 and 40 of conveyor 12 respectively are alike in form and therefore only a single device will be considered in detail. The transfer devices include a support frame 76, a track 78 mounted on the support frame, a transfer carriage 80 movable horizontally on track 78, a lift 82 supported for vertical movement by carriage 80 and having rotatable hooks 84 attached thereto. The transfer device also includes actuating means for the hooks 84, lift 82 and carriage 80 and pneumatic control means for the actuating means.

Support frame 76 includes vertical posts 86 positioned on bearing plates 88 which may be fastened to floor 46 by means of anchor bolts (not shown). A horizontal beam 90 and a front plate 91 are provided crosswise of frame 76 as shown. Channel 92 lengthwise of frame 76 on both sides thereof and extending over conveyor 18 is provided to support track 78. The support frame may be constructed of structural steel and welded or riveted together.

Tracks 78 provided on both sides of the support frame are angle members attached to channels 92. Tracks 78 extend from the outer end of channels 92 over conveyor 18 inwardly as shown in FIGURES 1 and 2. Transfer carriage 80 is mounted on tracks 78 for horizontal movement thereon.

Transfer carriage 80 includes rectangular frame 92 of channel members, vertical guide angles 96 in rectangular arrangement attached to frame 94 to guide lift 82 and angle cross members 98. Transfer carriage 80 also includes transverse axles 100 extending through frame 94 in bearings 102. Wheels 104 are attached to the ends of axles 100 and support carriage 80 in tracks 78.

Lift 82 is supported within frame 94 by an actuating cylinder 116 to be considered later and is guided in vertical movement by angles 96. Lift 82 is constructed of steel in the form of a box 106 open at both ends having cross member 108 at the top thereof. An axle 110 is provided crosswise of lift 82 as shown. Hooks 84 are attached to axle 110 and rotate with it. Lever arm 112 is provided on axle 110 to facilitate rotation of the axle and associated hooks.

Pneumatic actuating cylinders 114, 115 and 116 are provided on each of transfer devices 14 and 15 to actuate the hooks 84, lift 82 and transfer carriage 80 respectively so that hooks 84 may rotate to engage or disengage weights 16, lift 82 will raise or lower weights 16 and transfer carriage 80 will move the weights horizontally.

Cylinder 114 is mounted on lift 82 as shown and is operative in conjunction with lever 112 to rotate axle 110 and the hooks 84 attached thereto. Weight 16 is engaged by hooks 84 when cylinder 114 is retracted and disengaged when the cylinder is extended.

Cylinder 116 is positioned on cross members 98 attached to transfer carriage 80 and supports lift 82 by means of cross member 108 at the approximate center thereof as indicated in FIGURES 1–3. In the extended position of cylinder 116 the lift 82 is raised in guide angles 96 to its highest position.

Cylinder 118 is mounted between support frame 76 and transfer carriage 80 on angle members 119 as shown in FIGURES 1 and 2. Cylinder 118 acts to move carriage 80 horizontally back and forth along track 78. In the extended position of the cylinder transfer carriage 80 and therefore lift 82 is positioned over conveyor 18. In the retracted position of the cylinder transfer carriage 80 is positioned over conveyor 12.

Transfer system 10 is further provided with pneumatic control systems for transfer devices 14 and 15 operable manually or automatically to actuate cylinders 114, 116 and 118 so that transfer device 14 transfers weights from conveyor 18 at point 22 to conveyor 12 and transfer device 15 transfers weights from conveyor 12 to conveyor 18 at point 20. The control systems for transfer devices 14 and 15 are similar. They will be treated separately however in regard to automatic operation due to the differences therein necessitated by the different sequence of operation of cylinders 114, 116 and 118 in the two transfer devices in automatic operation.

Figure 4:
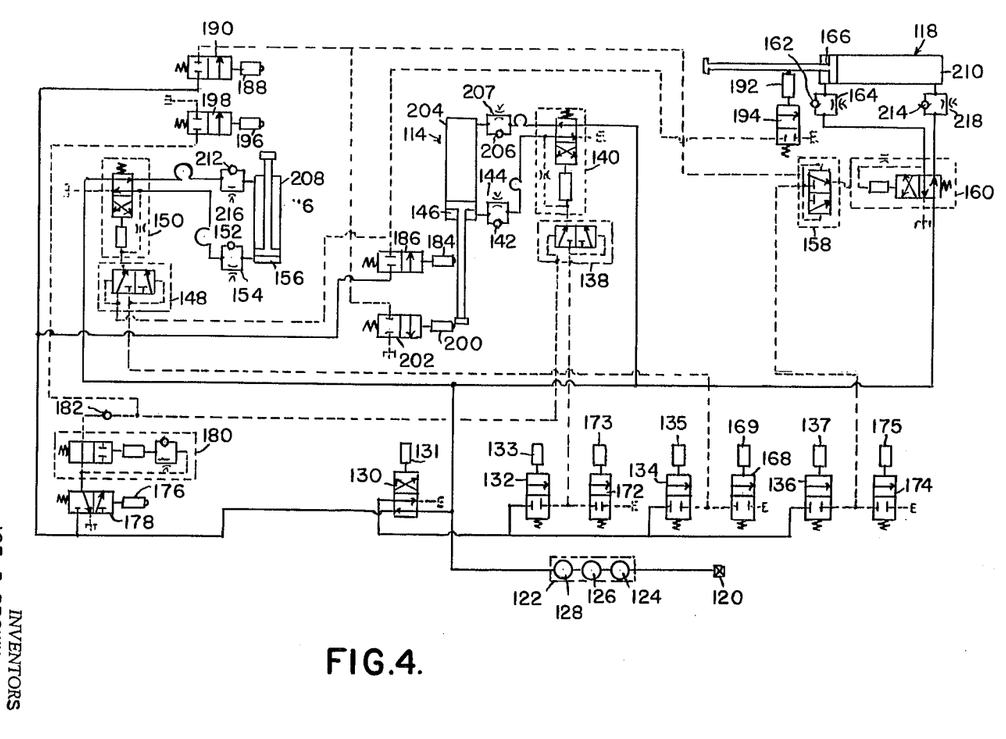
FIGURE 4 is a diagrammatic illustration of the pneumatic control system of the transfer device 15 of the invention shown in FIGURES 1–3.
Figure 5:
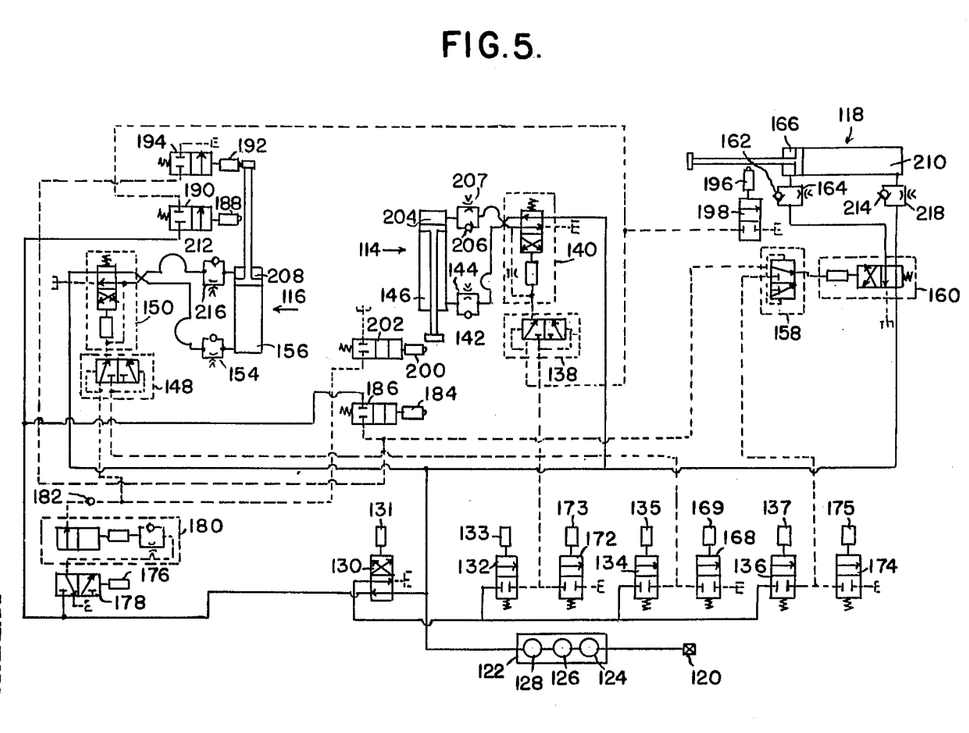
FIGURE 5 is a diagrammatic illustration of the pneumatic control system of the transfer device 14 of the invention shown in FIGURES 1–3.

In FIGURES 4 and 5 the control system of transfer devices 14 and 15 respectively are illustrated diagrammatically. In the diagrams identical components have been given identical numbers. The dotted lines between blocks indicate pilot pressure and may be one-quarter inch pneumatic piping. The solid lines between blocks indicate line pressure and may be one-half inch pneumatic piping. Block 120 indicates a source of pneumatic pressure. Block 122 indicates a filter 124, regulator 126 and lubricator 128 in the pneumatic supply line. At 130 there is indicated a selector valve allowing a selection to be made between manual and automatic operation of transfer devices 14 and 15.

For manual operation the control system of FIGURES 4 and 5 are identical and will be considered with respect to the initial position of cylinders 114, 116 and 118 as shown in FIGURE 4. Selector valve 130 is actuated manually with switch 131 to allow line pressure to be applied to pilot valve 132, 134 and 136 as indicated.

Manual actuation of valve 132 with switch 133 then will supply pilot pressure to shuttle valve 138 causing shuttle valve 138 to shift thereby applying pilot pressure to mounted valve 140 causing mounted valve 140 to shift thereby feeding line pressure through check valve 142 and incidentally through restricted orifice 144 to end 146 of cylinder 114 and allowing pressure from end 204 of cylinder 114 to exhaust through restricted orifice 207. Line pressure in end 146 of cylinder 114 with end 204 exhausted causes the cylinder to retract rotating hooks 84 attached thereto by means of lever 112 and axle 110 illustrated in FIGURES 1 and 3 into engagement with weight 16.

Actuating valve 134 with switch 135 will cause pilot pressure to be applied to shuttle valve 148 causing shuttle valve 148 to shift thereby applying pilot pressure to mounted valve 150. Mounted valve 150 therefore shifts causing line pressure to be fed through check valve 152 and restricted orifice 154 into end 156 of cylinder 116 and allowing pressure in end 208 of cylinder 116 to be exhausted through restricted orifice 216. The line pressure in end 158 extends cylinder 116 thereby causing lift 82 to rise.

When pilot valve 136 is actuated by means of switch 137 pilot pressure is applied to shuttle valve 158 causing valve 158 to shift applying pilot pressure to mounted valve 160 causing valve 160 to shift whereby line pressure is fed through check valve 162 and restricted orifice 164 into end 166 of cylinder 118 and pressure in end 210 of cylinder 118 is exhausted through restricted orifice 218 allowing cylinder 118 to retract moving transfer carriage 80 from a position over conveyor 18 to a position over conveyor 12.

Manually operating pilot valve 168 with switch 169 exhausts pilot pressure from shuttle valve 148 and mounted valve 150 allowing mounted valve 150 to return to its original position causing the air in end 156 of cylinder 116 to be exhausted under control through restricted orifice 154 thereby lowering said lift.

Similarly operation of pilot valve 172 with switch 173 causes cylinder 114 to exhaust through controlled restricted orifice 144 allowing cylinder 114 to move to its extended position thereby rotating hooks 84 out of engagement with weight 16.

Pilot valve 174 is actuated by means of switch 175 exhausting pilot pressure from shuttle valve 158 and mounted valve 160 whereby air in cylinder 118 is allowed to exhaust through restricted orifice 164 causing cylinder 118 to assume its extended position thereby moving transfer carriage 80 into position over conveyor 18.

The sequence of operation of switches 133, 173, 135, 169, 137 and 175 in manual operation to control the movement of the hooks and lift carriage on either of transfer devices 14 and 15 is entirely optional with the operator and will depend on the movement desired.

The automatic sequence of operation of transfer device 14 is considered with reference to FIGURE 5. At the start of a cycle of automatic operation of transfer device 14 the cylinders and valves are as shown in FIGURE 5. The hooks 84 attached to retracted cylinder 114 are in the engaged position supporting a weight 16. The lift 82 supported by extended cylinder 116 is in the raised position. The transfer carriage 80 attached to extended cylinder 118 is in position over conveyor 18. All cam switches are open. In this condition transfer device 14 holding weight 16 is prepared to automatically deposit weight 16 on cope 28 moving on conveyor 18 and pick up another weight from the stored position on conveyor 12.

With selector valve 130 in the automatic position as shown when flat cars 26 having cope 28 thereon arrive at point 20 on conveyor 18 cam switch 176 is operated by contact with cope 28 in a manner later described to allow pilot pressure to flow through pilot valve 178, sequence valve 180, check valve 182 and shuttle valve 148 to cause cylinder 116 to retract in the manner previously indicated thereby lowering lift 82 setting weight 16 on cope 28. The exact position of cam switch 176, the speed of conveyor 18 and the response time of lift 82 are synchronized so that weight 16 is correctly placed on cope 28 as cope 28 travels beneath lift 82.

Lowering of lift 82 closes cam switch 188 actuating pilot valve 190 allowing pilot pressure to flow to shuttle valve 138 and mounted valve 140 causing cylinder 114 to extend thereby disengaging the hooks from weight 16. The disengaging of the hooks must be timed with respect to the travel of conveyor 18 so that hooks 84 clear weight 16 while weight 16 is in position under lift 82.

When cylinder 114 extends cam switch 184 is closed actuating pilot valve 186 thereby applying pilot pressure to shuttle valve 158 and mounted valve 160 causing cylinder 118 to retract as previously described. The transfer carriage 80 is thereby moved to a position over conveyor 12 at end 38 where weights 16 are stored waiting to be transferred to a cope 28 moving on conveyor 18. Cam switch 188 is opened by moving of lift 82.

Cam switch 196 closes when lift 82 is in position over conveyor 12 thereby actuating pilot valve 198 to exhaust shuttle valve 138 allowing mounted valve 140 to return to its original position thereby causing cylinder 114 to be retracted as previously explained. Retraction of cylinder 114 causes hooks 84 to rotate and engage a weight stored at end 40 of conveyor 12.

Retraction of cylinder 114 closes cam switch 200 actuating pilot valve 202 to exhaust shuttle valve 148 allowing mounted valve 150 to assume its original position causing cylinder 116 to extend raising the lift 82. Raising lift 82 opens cam switches 196 and 200.

Extension of cylinder 116 closes cam switch 192 actuating pilot valve 194 to exhaust shuttle valve 158 allowing mounted valve 160 to assume its original position causing cylinder 118 to extend. The extension of cylinder 118 opens cam switch 196 thus completing the automatic cycle of operation of transfer device 14.

The automatic sequence of operation of transfer device 15 may be explained with reference to FIGURE 4.

At the start of a cycle of automatic operation of transfer device 15 the cylinders and valves are as shown in FIGURE 4. The hooks 84 attached to cylinder 114 are in the disengaged position, the lift 82 supported by cylinder 116 is in the down position and the transfer carriage 80 attached to cylinder 118 is positioned over conveyor 18. In this position transfer device 15 is prepared to automatically remove a weight from conveyor 18 and place it on conveyor 12.

With selector valve 130 in the automatic position as shown when flat cars 26 having cope 28 thereon arrive at point 22 on conveyor 18 cam switch 176 is operated by contact with cope 28 in a manner later described to allow pilot pressure to flow through pilot valve 178, sequence valve 180, check valve 182 and shuttle valve 138 to cause cylinder 114 to retract setting hooks 84 as previously indicated.

When cylinder 114 retracts cam switch 184 is closed actuating pilot valve 186 which allows pilot pressure to flow to shuttle valve 148 extending cylinder 116 as previously indicated lifting lift 82.

As cylinder 116 is extended cam switch 188 is closed actuating pilot valve 190 allowing pilot pressure to flow through shuttle valve 158 retracting cylinder 118 as previously indicated whereby transfer carriage 80 is moved along track 78 moving lift 82 from its position over conveyor 18 to a position over conveyor 12 allowing cam switch 188 to open.

Cam switch 192 is operated by cylinder 118 as it retracts causing pilot valve 194 to actuate exhausting pilot pressure from shuttle valve 148 causing cylinder 116 to retract as previously indicated lowering lift 82 and opening cam switch 192.

As cylinder 116 retracts cam switch 196 is closed actuating pilot valve 198 exhausting pilot air from shuttle valve 138 thereby causing cylinder 114 to extend as previously indicated rotating hooks 84 into the disengaged position opening cam switch 184.

Extension of cylinder 114 closes cam switch 200 actuating pilot valve 202 which exhausts pilot pressure from shuttle valve 158 thereby causing cylinder 118 to retract as previously indicated whereby lift 82 is again positioned over conveyor 18 and cam switches 196 and 200 are opened completing the automatic cycle of operation of transfer device 15.

Sequence valve 180 serves to remove line pressure from shuttle valve 138 in FIGURE 4 and from shuttle valve 148 in FIGURE 5 should cam switch 176 remain closed during the entire automatic cycle of transfer device 14 or 15. Check valve 182 serves to retain the pilot pressure applied to shuttle valve 138 in FIGURE 4 and 148 in FIGURE 5 should cam switch 176 open during the automatic cycle of device 14 or 15.

The manual switches and pilot valves, the shuttle valves and moving valves along with selector switch 130, sequence valve 180, the check valves and restricted orifices may be located on control panels (not shown) associated with transfer devices 14 and 15. Suitable pneumatic lines connecting the switches, valves and cylinders as indicated in FIGURES 4 and 5 are provided between the control panels and the transfer devices.

Figure 6:
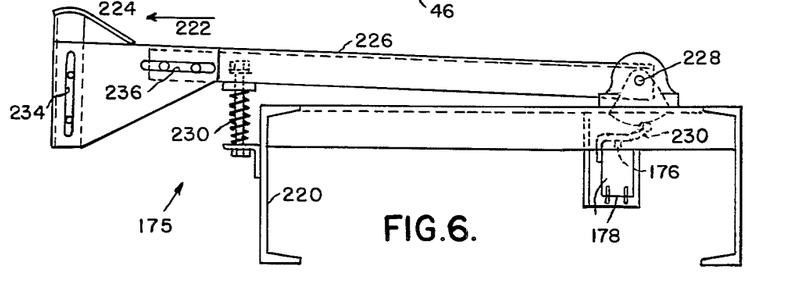
FIGURES 6–12 are details of the automatic switch actuating means of the embodiment of the invention shown in FIGURES 1–5.

The supporting structure 175 for cam switches 176 referred to in consideration of the control system of transfer devices 14 and 15 are illustrated in detail in FIGURE 6. They are positioned as indicated in FIGURES 1 and 2 at each end of conveyor 12 in association with conveyor 18. They function as indicated to initiate the automatic cycle of operation of the associated transfer device 14 or 15.

Referring to FIGURE 6, as flat car 26 with cope 28 thereon approaches post 220 from the direction indicated by the arrow 222 cope 28 strikes projection 224 causing lever arm 226 to pivot with cam carrying axle 228 about axle 223 in opposition to spring 230. Cam 232 on axle 228 therefore causes lever 239 to depress actuating cam switch 176 starting the automatic sequence of operation if selection switch 130 is in the automatic position. Cam switch 176 remains actuated until cope 28 passes projection 224 on lever 226 on post 220. Sliding connections 234 and 236 are provided as indicated to adjust the position of projection 224 thereby controlling the relative position of a cope on conveyor 18 at which switch 176 is actuated.

The exact position of support structure 175 with reference to conveyor 18 and transfer devices 14 and 15 is dependent on the speed of conveyor 18 and the response time of lift 82 and hooks 84. Structure 175 at end 38 of conveyor 12 in association with transfer device 14 must be positioned with respect to point 22 on conveyor 18 so that after actuation of switch 176 by cope 28 the cope carrying weight 16 and traveling on conveyor 18 will arrive at point 20 at the same time hooks 84 rotate to engage weight 16. Structure 175 at end 40 of conveyor 12 in association with transfer device 15 must be positioned with respect to point 20 on conveyor 18 so that after actuation of switch 176 by cope 28 traveling on conveyor 18 on which it is desired to deposit a weight the cope arrives at point 22 at the same time weight 16 is in position to cause hooks 84 to rotate disengaging weight 16. With structure 175 positioned as indicated it can be seen that a moving pick up and deposit of weights 16 can be accomplished automatically by transfer system 10.

Figure 7:
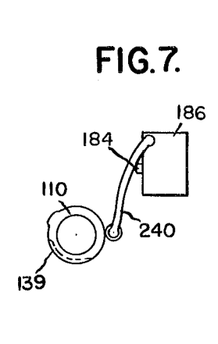

Cam switches 184 and pilot valves 186 are positioned on lifts 82 on both transfer device 14 and 15 as shown in FIGURE 1 as they would appear on transfer device 15. When cylinder 114 causes axle 110 to rotate cam switch 184 is actuated as previously indicated. A detail of cam switch 184 is shown in FIGURE 7. Cam cylinder 139 is fitted over the end of axle 110 and rotates therewith. On rotation of cam cylinder 139 lever arm 240 causes switch 184 to close.

Figures 8, 10, 11:
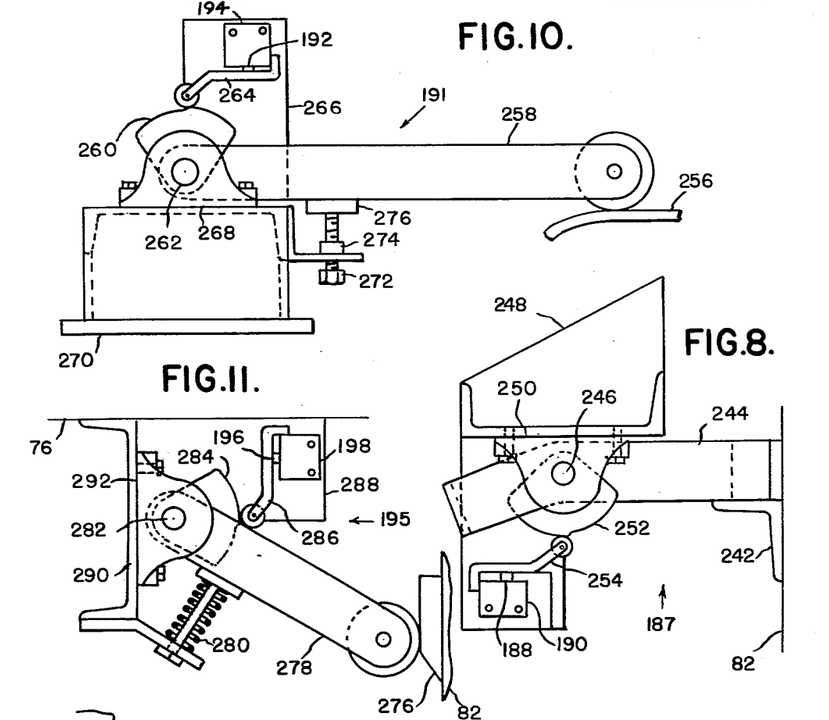

A mounting structure 187 for cam switch 188 with pilot valve 190 attached is illustrated in FIGURE 8 in detail and is shown in position on transfer device 14 in FIGURE 1. As lift 82 rises angle 242 on lift 82 contacts lever arm 244 pivoting axle 246 which is secured to cross member 90 of frame 76 by members 248 and 250. Cam 252 also attached to axle 246 rotates therewith actuating switch 188 through arm 254.

Figure 9:
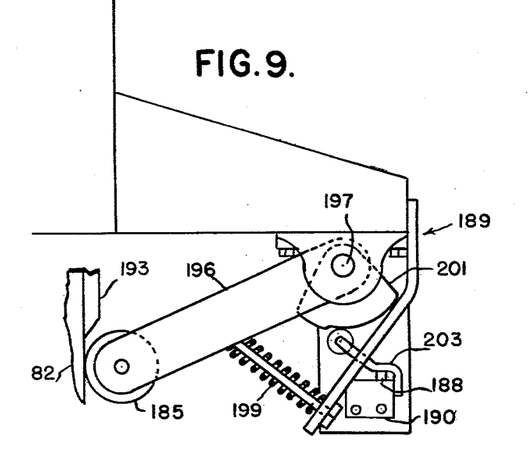

A second mounting structure 189 on cam switch 188 with pilot valve 190 attached is illustrated in FIGURE 9 in detail and is shown in position on transfer device 15 in FIGURE 1. As lift 82 lowers, roller 185 cams over cam surface 193 on lift 82 whereby lever arm 196 is pivoted with axle 197 in opposition to spring 199. Pivoting of axle 197 causes cam 201 to pivot thereby actuating switch 188 through arm 203.

A mounting structure 191 for cam switch 192 and pilot valve 194 on transfer devices 15 and 14 is illustrated in FIGURE 10 in detail as it would appear on device 15. The mounting structure 191 is shown mounted on frame 76 of transfer devices 14 and 15 in FIGURE 1. Rigid guide member 256 attached to lift 82 raises lever arm 258 causing cam 260 attached to axle 262 to close actuating switch 192 through arm 264. Members 266, 268 and 270 are provided to correctly position switch 192 and lever arm 258 for contact with member 256. Adjustment of lever arm 258 is provided by bolt 272, nuts 274 and block 276.

A mounting structure 195 for cam switch 196 and pilot valve 198 on transfer devices 15 and 14 is shown in detail in FIGURE 11 as it would appear on device 15 and is illustrated attached to frame 76 of transfer devices 14 and 15 in FIGURE 1. Projecting cam surface 276 on lift 82 causes arm 278 to pivot when they are brought in contact. The pivoting action of arm 278 is in opposition to spring 280 rotating axle 282 and cam 284 attached thereto whereby switch 196 is actuated by lever arm 286. Members 288, 290 and 292 are provided to secure arm 278 and switch 196 to frame 76.

Figure 12:
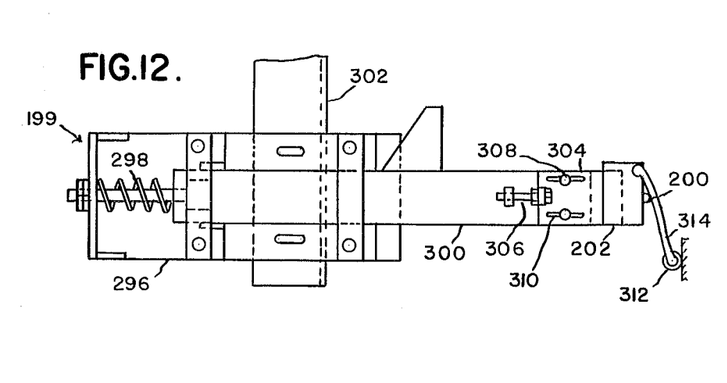

A mounting structure 199 for cam switch 200 with pilot valve 202 which is positioned as indicated in FIGURE 1 is provided on transfer devices 14 and 15 and is shown in detail in FIGURE 12 as it would appear on device 15.

Cam switch mounting structure 199 comprising mounting bracket 296, resilient spring 298 and slide 300 is illustrated attached to channel member 290 on frame 76 by angle member 302. Member 304 carrying pilot valve 202 and cam switch 200 is adjustably positioned on slide 300 with bolts 306 and bolts 308 in slots 310. Slide 300 in conjunction with spring 298 serves to prevent damage to switch 200 and valve 202 while assuring a firm contact between roller 312 on lever arm 314 with cam cylinder 138 on axle 110 when lift 82 is in the lowered position over conveyor 12.

In operation it is desired to automatically transfer weights arriving at point 20 on copes moving on conveyor 18 to end 8 of conveyor 12, transfer the weights along conveyor 12 to end 40, store the weights at end 40 of conveyor 12 and when a cope moving on conveyor 18 arrives at point 22 to deposit one of the stored weights on the moving cope. The position of the lifts and hooks on transfer devices 14 and 15 at the start of an automatic cycle of operation is as indicated in FIGURE 1.

With reference to transfer device 14 and the sequence of events at point 22 on conveyor 18, as car 26 carrying cope 28 with a weight 16 thereon approaches point 22 on conveyor 18 cope 28 causes switch 176 positioned along side conveyor 18 to close. Cylinder 114 therefore retracts rotating hooks 84 into engagement with moving weight 16. Rotation of hooks 84 closes switch 184 causing cylinder 116 to extend raising lift 82. As previously indicated the position of switch 176 must be coordinated with the speed of conveyor 18 and the response time of hooks 84 and lift 82 to insure a proper moving pick up of weight 16. When lift 82 reaches its maximum height switch 188 is closed causing cylinder 118 to retract moving transfer carriage 80 and therefore lift 82, hooks 84 and weight 16 to a position over end 38 of conveyor 12. Switch 192 is closed when lift 82 reaches the desired position over conveyor 12 causing cylinder 116 to retract lowering lift 82. When lift 82 has lowered weight 16 onto conveyor 12 switch 196 is closed causing cylinder 114 to extend rotating hooks 84 out of engagement with weight 16. Rotation of hooks 84 out of engagement with weight 16 closes switch 200 causing cylinder 118 to extend replacing transfer carriage 80, lift 82 and hooks 84 back in their initial position over conveyor 18 await the approach of another cope to point 20 at which time the above sequence of events will be automatically repeated.

Weights 16 deposited on free running continuous conveyor 12 at end 38 are transported by moving belt 34 to end 40 where they are stored until transfer device 15 removes them from conveyor 12. Storage of weights 16 at end 40 of conveyor 12 is made possible by the particular structure of belt 34 as previously described.

With reference to transfer device 15 and the sequence of events at point 20 on conveyor 18, as a car 26 carrying cope 28 approaches point 20 on conveyor 18 cope 28 causes switch 176 positioned along side conveyor 18 to close. Cylinder 116 therefore retracts lowering lift 82 and therefore weight 16 until weight 16 rests on cope 28 which has reached point 22 on conveyor 18. Lowering lift 82 closes switch 188 extending cylinder 114 causing hooks 84 to rotate out of engagement with weight 16. As previously indicated the position of switch 176 must be coordinated with the speed of conveyor 18 and the response time of lift 82 and hooks 84 to insure the proper placement of weight 16 on moving cope 28. Rotation of hooks 84 closes switch 184 retracting cylinder 118 moving transfer carriage and lift into position over end 40 of conveyor 12 where weights 16 are stored as indicated above. When lift 82 moves into position over weights 16 switch 196 closes retracting cylinder 114 causing hooks 84 to grasp weight 16. Rotation of hooks 84 closes switch 200 extending cylinder 116 causing lift 82 and weight 16 to rise. When lift 82 reaches its uppermost position switch 192 is closed extending cylinder 118 whereby lift 82 carrying weight 16 is repositioned over conveyor 18 to await the approach of another cope to point 20 at which time the above sequence of events will be automatically repeated.

Thus it can be appreciated that the present invention comprising a separate conveyor having a transfer device at both ends is capable of removing moving articles from a continuous conveyor at one point, transporting them transversely of the continuous conveyor to a second point where the continuous conveyor is traveling parallel to and in the opposite direction to that at which it was traveling at the first mentioned point and redepositing the articles on the moving continuous conveyor at the second point. In the performance of this desired operation the invention may operate completely automatically or in response to manually operated switches. The result of the operation described is that it is possible to repeatedly move articles needed for production between certain points on a continuous conveyor between said certain points entirely automatically with complete assurance of exact removal and placement of the articles on the continuous conveyor.

The drawings and the foregoing specification constitute a description of article transfer system in such full, clear, concise and exact terms as to enable any person skilled in the art to practice the invention, the scope of which is indicated by the appended claims.

What we claim as our invention is:

1. In combination with a continuously moving main conveyor having laterally spaced portions an article transfer system, comprising a separate conveyor extending substantially perpendicularly to and positioned between said laterally spaced portions of the moving conveyor and a transfer device positioned at each end of said separate conveyor movable perpendicularly to the main conveyor and having no component of movement in the direction of movement of the adjacent portion of the main conveyor including a structural frame, tracks attached to said frame, a transfer carriage movably mounted on said tracks, a lift supported by the transfer carriage and movable vertically with respect thereto, a pair of rotatable hooks attached to said lift, actuating means for moving said transfer carriage on said tracks, for moving said lift vertically with respect to the transfer carriage and for rotating said hooks, control means for actuating said actuating means, and switch means controlling said control means in response to a plurality of predetermined conditions including a plurality of separate automatically operated switch structures for initiating movement of said transfer carriage, lift and hooks in a predetermined sequence, said separate switch structure for initiating movement of the transfer carriage including a lever pivoted to the transfer carriage having one end extending at an angle thereto operable to engage the transfer carriage to limit pivoting of the lever due to gravity, an abutment on said lift engageable with the other end of the lever in the upper position of the lift to pivot said one end of the lever out of engagement with the carriage, a switch cam secured to the lever for pivotal movement therewith and a switch actuated by said switch cam with the lift in the upper position thereof.

2. The structure as claimed in claim 1 wherein said switch means also includes a plurality of separate manually operated switches for initiating movement of said transfer carriage, lift and hooks.

3. The structure as claimed in claim 2 and also including a manually operable selector for selecting exclusive manually operated switch control of said control means or automatically operated switch control of said control means.

4. In combination with a continuously moving main conveyor having laterally spaced portions an article transfer system, comprising a separate conveyor extending substantially perpendicularly to and positioned between said laterally spaced portions of the moving conveyor and a transfer device positioned at each end of said separate conveyor movable perpendicularly to the main conveyor and having no component of movement in the direction of movement of the adjacent portion of the main conveyor including a structural frame, tracks attached to said frame, a transfer carriage movably mounted on said tracks, a lift supported by the transfer carriage and movable vertically with respect thereto, a pair of rotatable hooks attached to said lift, actuating means for moving said transfer carriage on said tracks, for moving said lift vertically with respect to the transfer carriage and for rotating said hooks, control means for actuating said actuating means including an automatically operating switch for initiating movement of said transfer carriage including a lever pivoted to the transfer carriage having one end extending at an angle thereto operable to engage the transfer carriage to limit pivoting of the lever due to gravity, an abutment on said lift engageable with the other end of the lever in the upper position of the lift to pivot said one end of the lever out of engagement with the carriage, a switch cam secured to the lever for pivotal movement therewith and a switch actuated by said switch cam with the lift in the upper position thereof.

References Cited in the file of this patent

UNITED STATES PATENTS

| | | |
|---|---|---|
| 614,306 | Mason | Nov. 15, 1898 |
| 1,852,942 | Streine | Apr. 5, 1932 |
| 2,268,075 | Langer | Dec. 30, 1941 |
| 2,467,113 | Deiters | Apr. 22, 1949 |
| 2,481,486 | Abbott | Sept. 13, 1949 |
| 2,525,572 | Woody | Oct. 10, 1950 |
| 2,701,399 | Underwood | Feb. 8, 1955 |
| 2,714,324 | Dismore | Aug. 2, 1955 |
| 2,724,482 | De Francisci | Nov. 22, 1955 |
| 2,730,251 | Schutt | Jan. 10, 1956 |
| 2,732,956 | Horner | Jan. 31, 1956 |
| 2,830,341 | Buhrer | Apr. 15, 1958 |
| 2,844,263 | Dreyer | July 22, 1958 |
| 2,980,265 | Johnson | Apr. 18, 1961 |
| 2,985,926 | Fellows | May 30, 1961 |